United States Patent
Letter et al.

(10) Patent No.: US 12,525,852 B2
(45) Date of Patent: Jan. 13, 2026

(54) STATOR FOR AN ELECTRIC MOTOR WITH AT LEAST ONE POCKET FOR RECEIVING A TEMPERATURE MONITORING ELEMENT

(71) Applicant: ebm-papst Mulfingen GmbH & Co. KG, Mulfingen (DE)

(72) Inventors: Tobias Letter, Bad Mergentheim (DE); Madlene Schmidt, Igersheim (DE)

(73) Assignee: EBM-PAPST MULFINGEN GMBH & CO. KG, Mulfingen (DE)

( * ) Notice: Subject to any disclaimer, the term of this patent is extended or adjusted under 35 U.S.C. 154(b) by 268 days.

(21) Appl. No.: 18/211,459

(22) Filed: Jun. 19, 2023

(65) Prior Publication Data

US 2023/0421026 A1     Dec. 28, 2023

(30) Foreign Application Priority Data

Jun. 24, 2022   (DE) .......................... 102022115851.9

(51) Int. Cl.
*H02K 11/25*     (2016.01)
*H02K 1/14*      (2006.01)

(52) U.S. Cl.
CPC ............. *H02K 11/25* (2016.01); *H02K 1/146* (2013.01)

(58) Field of Classification Search
CPC ... G01K 1/14; G01K 1/18; G01K 13/08; H02K 1/146; H02K 11/25; H02K 15/12; H02K 2203/09; H02K 3/38; H02K 3/522
USPC ...................................................... 310/68 C
See application file for complete search history.

(56) References Cited

U.S. PATENT DOCUMENTS

| | | | |
|---|---|---|---|
| 10,270,317 B2 * | 4/2019 | Deubler | G01K 1/12 |
| 11,223,258 B2 | 1/2022 | Fuchs et al. | |
| 2011/0080072 A1 | 4/2011 | Stroebel et al. | |
| 2013/0320817 A1 * | 12/2013 | Marschall | H02K 11/25 |
| | | | 310/68 C |
| 2016/0380518 A1 | 12/2016 | Deubler et al. | |

(Continued)

FOREIGN PATENT DOCUMENTS

| | | |
|---|---|---|
| DE | 102013201834 A1 | 8/2014 |
| DE | 102016213866 A1 | 2/2018 |

(Continued)

OTHER PUBLICATIONS

European search report dated Nov. 15, 2023.
German Search Report dated Apr. 18, 2023.

*Primary Examiner* — Alex W Mok
(74) *Attorney, Agent, or Firm* — Dickinson Wright PLLC

(57) ABSTRACT

A stator for an electric motor having stator teeth arranged about an axis of rotation, which are each wound with a winding, and at least one heat-conductive contact element, wherein the at least one contact element extends in the axial direction from a region adjoining the windings in the axial direction in each case between two windings and is formed to be deformable and/or deflectable in the circumferential direction for direct contact with at least one of the windings. The windings are overmolded or remolded with an electrically non-conductive material forming an encapsulation, which material forms with the at least one contact element in each case a pocket for receiving a temperature monitoring element which can be inserted in the axial direction, the winding-side wall of which is formed at least in a section by the contact element directly abutting the winding.

15 Claims, 3 Drawing Sheets

(56) References Cited

U.S. PATENT DOCUMENTS

2020/0303984 A1    9/2020  Coldwate et al.
2020/0373818 A1*  11/2020  Fuchs ................... H02K 11/25
2021/0328471 A1*  10/2021  Böckenhoff ............ H02K 1/30

FOREIGN PATENT DOCUMENTS

EP       2306622 A1    4/2011
WO    2021047711 A1    3/2021

* cited by examiner

STATOR FOR AN ELECTRIC MOTOR WITH AT LEAST ONE POCKET FOR RECEIVING A TEMPERATURE MONITORING ELEMENT

RELATED APPLICATIONS

This application claims priority to German Patent Application No. 10 2022 115 851.9, filed Jun. 24, 2022, the entire contents of which are incorporated herein by reference in their entirety.

FIELD

The disclosure relates to a stator for an electric motor, wherein the stator has pockets for receiving a temperature monitoring element, and to an electric motor with such a stator, and to a method for producing such a stator.

BACKGROUND

In order to realize a thermal motor protection for stators in the prior art, it is usually provided that temperature monitoring elements, such as PTCs, temperature monitors or other temperature sensors, are arranged on their windings. In the case of remolded stators, this thermal monitoring usually takes place by tapping the winding temperature via domes leading out of the remolding. However, the problem here is that the domes react comparatively slowly to changing temperatures and the temperature detection is correspondingly slow or time-delayed.

Alternatively, it is known, for example from EP 3 113 336 A1, that pockets are arranged between the windings. However, the elements which form the pockets do not necessarily rest directly on the windings, so that these are at least partially spaced from the windings by the remolding. Therefore, it may also happen here that the heat is transferred only slowly to the pockets and to a sensor which may be arranged therein. Consequently, even in such a solution, there can only be a slow or time-delayed reaction to a temperature change.

In order to realize sufficient motor protection in these solutions, the motor must therefore be switched off at comparatively low temperatures or its power reduced, which makes operation correspondingly inefficient.

In order to solve the problem, pockets would be conceivable which are formed directly by cores guided on the windings during the overmolding or remolding of the windings. However, we have found these cores can damage the windings comparatively easily, so that the stator may be damaged in a non-acceptable way when the pockets are formed.

BRIEF SUMMARY

It is therefore an object of the present disclosure to overcome the aforementioned disadvantages and to provide a stator at which the temperature of the windings can be monitored as accurately as possible and with a rapid reaction time, wherein the manufacture of such a stator is intended to be repeatable in a process-reliable manner.

This object is achieved by the combination of features according to the independent claims.

According to the disclosure, a stator for an electric motor is therefore proposed. The latter has stator teeth arranged about an axis of rotation, around which a winding is wound in each case. Furthermore, the stator has at least one thermally conductive contact element and preferably several, in particular three, thermally conductive contact elements, wherein the at least one contact element extends in the axial direction between two windings from a region adjoining the windings in the axial direction, i.e. along or parallel to the axis of rotation, and is designed to be deformable and/or deflectable in the circumferential direction relative to the axis of rotation for direct contact with at least one of the windings. Preferably, such a contact element is formed from a heat-conductive material, which is in particular an electrically non-conductive or electrically insulating material, such as plastic. Furthermore, the windings are overmolded or remolded with an electrically non-conductive material, such as, for example, plastic. This electrically non-conductive material forms an encapsulation of the windings, which can also be referred to as a remolding or overmolding of the windings or of the stator. Together with the at least one contact element, the material forms in each case a pocket for receiving a temperature monitoring element which can be inserted into the pocket in the axial direction. The pocket is correspondingly formed in the encapsulation and preferably has an end which is open in the axial direction. Such a temperature monitoring element can be inserted into the respective pocket, in particular from the region adjoining the windings in the axial direction, from which region the contact element extends between the windings. According to the disclosure, it is provided that a winding-side wall of the pocket is formed, at least in a section, by the contact element directly abutting the winding, wherein the temperature monitoring element can be preferably arranged on this section, so that the temperature monitoring element directly abuts the section of the contact element which directly abuts the winding.

The contact element is preferably formed to be pressed against the at least one winding during the manufacture of the stator and, in particular, during the overmolding or remolding of the windings for the manufacture of the encapsulation.

For the most rapid and exact temperature tapping possible, the temperature monitoring elements, preferably temperature sensors, are to be brought as close as possible to the winding despite the remolding or overmolding of the windings. By means of a more precise and more responsive temperature monitoring, the motor can be precisely controlled and utilized as thermally as possible. The basic inventive idea is therefore to form pockets during remolding or overmolding, which pockets directly adjoin or abut at least one winding in each case.

In these pockets, the temperature monitoring elements can then be arranged directly adjoining the windings or spaced apart from them only by the heat-conductive contact element and the temperature of the windings can be detected in a reaction-fast and exact manner.

In order to avoid damage to the windings when the contact elements are inserted between the windings, the contact elements are formed to be deformable as intended in the circumferential direction about the axis of rotation. As a result, the contact elements can preferably be arranged in an undeformed state between the two windings in each case, and can subsequently be brought into a deformed state in which they directly abut at least one of the windings. Correspondingly, the tool or a core which deforms the at least one contact element does not bear directly against the windings and cannot damage them. Because the at least one contact element does not "scrape" on the windings during insertion, but is preferably pressed against the windings orthogonally to the axial direction after insertion between the windings, the at least one contact element does not damage the windings either.

Within the scope of the disclosure, with respect to the contact elements abutting the windings, it can be understood that the distance between the respective contact element and the at least one associated winding is minimized and, for example, is less than 0.5 mm.

Furthermore, it must be taken into account that the windings may be completely surrounded by an insulating layer which has no or only little influence on the heat conduction.

A particularly advantageous variant of the stator provides that the at least one contact element has in each case two tongues extending in the axial direction between the two windings. In this case, a first tongue for direct contact with a first of the two windings in a first circumferential direction and a second tongue for direct contact with a second of the two windings is formed to be deformable and/or deflectable in an opposite second circumferential direction. The wall of the pocket formed with the contact element is correspondingly formed in a first section by the first tongue directly abutting the first winding and in a second section, which is preferably opposite in the circumferential direction in the pocket, by the second tongue directly abutting the second winding. The pocket is formed between the two tongues, so that a temperature monitoring element, which can be arranged in the pocket, can simultaneously abut both sections or both tongues and can monitor both windings. Alternatively, two temperature monitoring elements can also be arranged in the pocket, one of which is assigned to a respective winding.

The two tongues preferably surround the pocket in the circumferential direction and are separated by a slot running in the radial direction, as a result of which they can be deformed separately from one another.

The electrically non-conductive material or the remolding of the stator can also extend between the two tongues and in particular through the slot, i.e. into a region between the tongues, and form a wall of the pocket at least in sections between the tongues.

Because the material or the remolding extends between the tongues or engages around at least one single tongue, the deformed contact element can be held in its deformed state and thus abutting against the at least one winding even after removal of the tool or core deforming the contact element.

Accordingly, the contact element or its tongues can be plastically or elastically deformable.

In addition, starting from the region adjoining the windings in the axial direction, the tongues preferably run toward one another and thereby form a wedge which can be inserted between the windings in a correspondingly simpler manner.

In order to avoid damage to the windings when the at least one contact element is arranged and, in particular, when it is pushed in between the windings in the axial direction, it is preferably provided that the contact element in an undeformed state, relative to the axis of rotation in the circumferential direction, has a smaller extent than a distance of the two windings from one another in the circumferential direction.

In this case, it is provided in particular that the contact element has a first section in the axial direction, which is not arranged between the windings, and a second section, which directly adjoins in the axial direction and which is arranged or can be arranged between the windings. Since the first section is not arranged between the windings, it cannot damage the windings, so that in particular only the extent of the second section in the circumferential direction is smaller, i.e. the distance between the two windings.

Since the stator teeth with the windings extend in the radial direction with respect to the axis of rotation, the distance between each two immediately adjacent windings becomes larger radially on the outside. Correspondingly, the at least one contact element can be arranged in the radial direction preferably at a predetermined position or a predetermined section between the two windings, so that, in addition, the maximum extension of the contact element or of the second section of the contact element in the circumferential direction is smaller than the minimum distance between the two windings in the section of the windings in which the contact element is to be arranged.

Furthermore, the stator preferably has a switching disk which is arranged in the region adjoining the windings in the axial direction. The at least one contact element is fixed with its respective side extending from the region between the two windings on the switching disk and is formed in particular integrally with the switching disk.

In this case, the switching disk can be overmolded or remolded or encapsulated together with the windings with the electrically non-conductive material.

A further development of the disclosure also comprises at least one temperature monitoring element. In this case, it is provided that at least one temperature monitoring element is arranged in each case in the at least one pocket, wherein this temperature monitoring element can be arranged in the pocket in such a way that the temperature monitoring element of the respective winding lies opposite directly abutting the section of the contact element or the first and/or second tongue forming the wall of the pocket.

The temperature monitoring element may be, in particular, a PTC, a temperature monitor or another temperature sensor.

Furthermore, one aspect of the disclosure relates to an electric motor with a stator according to the disclosure.

In addition, the disclosure relates to a method for producing a stator according to the disclosure. According to the method, it is provided that the at least one contact element is pushed to the windings in a contact-free manner, preferably in the axial direction, between two windings in each case, so that the contact element extends from the region adjoining the windings in the axial direction between the windings without touching the windings. Subsequently, a core is pushed in the axial direction into and/or against the contact element from the region adjoining in the axial direction, wherein the contact element is deformed and/or deflected by the core in the circumferential direction and is pressed directly against at least one winding, so that thus a section of the contact element directly abuts the winding.

The core can be a lost core but also a reusable core, in particular in the form of a slide.

In a variant in which the contact element has two tongues, these are spread apart by the core in the circumferential direction until the first tongue abuts the first winding and the second tongue abuts the second winding.

Subsequently, the windings, the at least one contact element and the core can be overmolded or remolded with the electrically non-conductive material and thus the encapsulation of the stator can be formed. If the at least one contact element is fixed to a switching disk or is formed integrally therewith, the switching disk can also be overmolded or remolded directly with the material. As a result, the respective pocket is formed for each contact element, but this pocket is still filled with the core during manufacture.

The core can then, or after the remolding has solidified in a dimensionally stable manner, be removed.

Accordingly, it is preferably provided that the core is formed as a negative of the pocket. Furthermore, the core can also have an end which tapers in the axial direction and by means of which it can be guided in the axial direction into the at least one contact element or against the at least one contact element.

If several contact elements and correspondingly several cores are provided, the cores can be formed as one piece and/or integrally with one another.

The features disclosed above can be used in any combination, as far as this is technically feasible and they do not contradict each other.

BRIEF DESCRIPTION OF THE DRAWINGS

Other advantageous further developments of the disclosure are designated in the dependent claims or are represented in further detail below along with the description of the preferred embodiment of the disclosure with reference to the figures. In the drawings:

DETAILED DESCRIPTION

The figures are schematic for illustration. Like reference numbers in the figures indicate like functional and/or structural features.

Furthermore, FIGS. 1 to 5 preferably represent different views and components of a stator 1, so that the corresponding features and description can be transmitted analogously.

Figure 1:
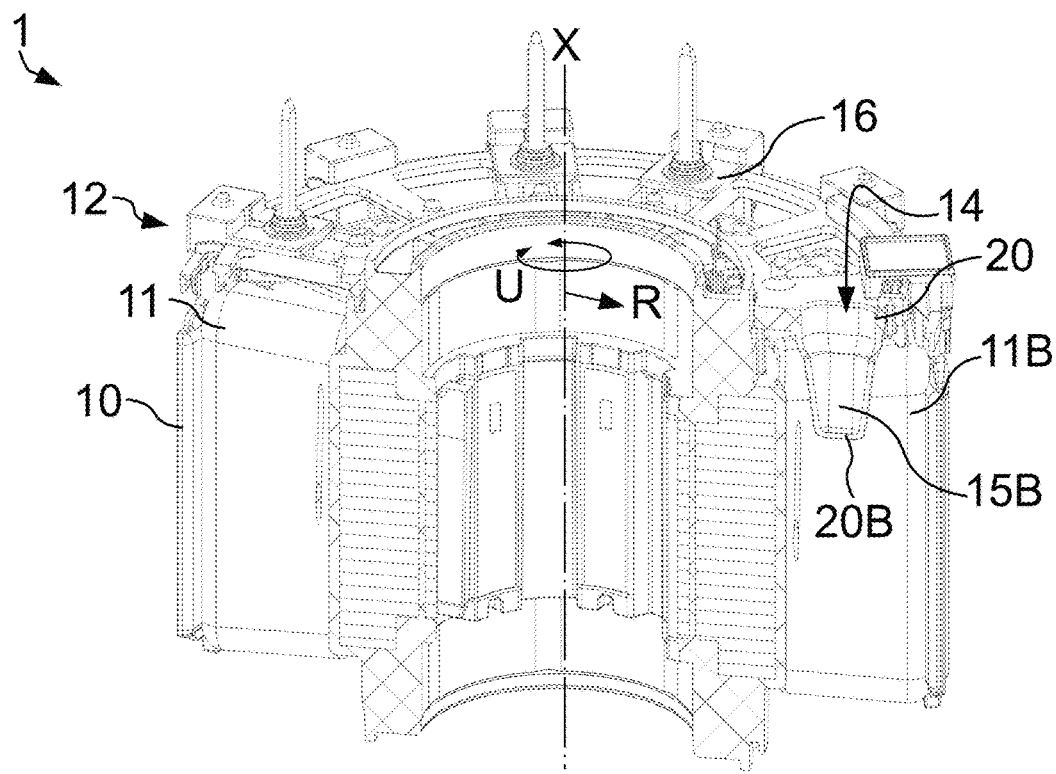
FIG. 1 shows a perspective stator in longitudinal section.
Figure 3:
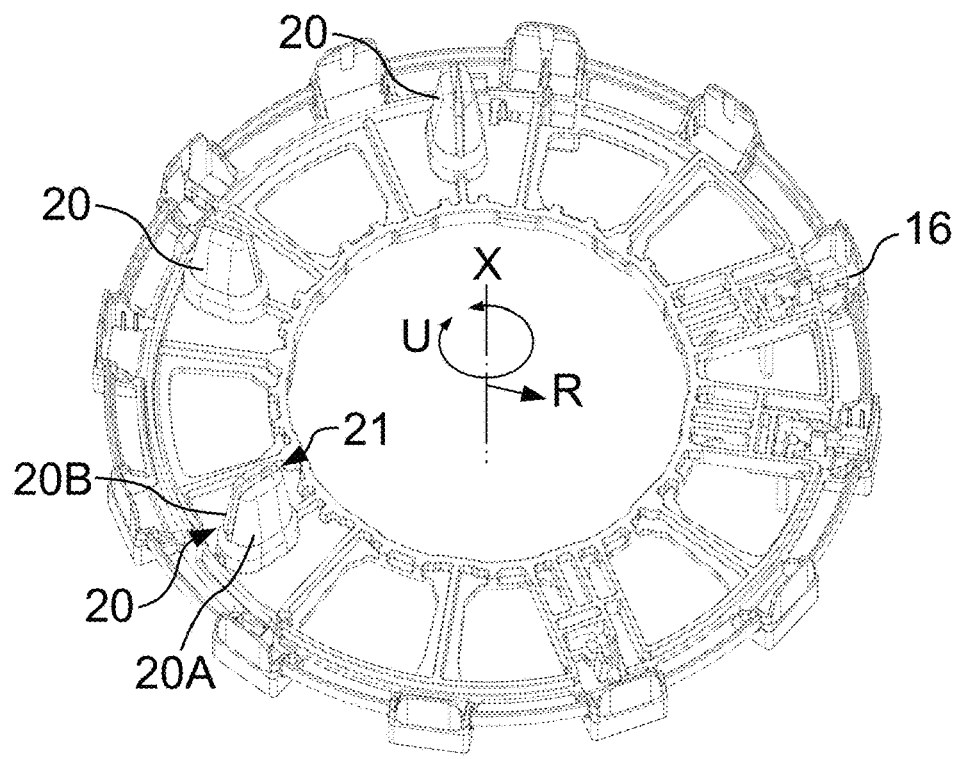
FIG. 3 shows a switching disk with integrally formed contact elements.

In the longitudinal section through the stator 1 represented in FIG. 1, it is represented in particular that a switching disk 16 is arranged in the region 12, which in the axial direction, i.e. along the axis of rotation X directly adjoins the stator teeth 10 wrapped around by the windings 11, and integrally forms three contact elements 20, as can be seen in FIG. 3. Each of the three contact elements 20 has two tongues 20A, 20B which are separated from one another by a slot 21 running through the contact element 20 in the radial direction R, so that the two tongues 20A, 20B can be deflected separately from one another in the circumferential direction. In the present case, the two tongues 20A, 20B are each formed as a half-shell, so that they engage around the pocket 14 in sections in the circumferential direction U.

The tongues 20A, 20B or the contact elements 20 extend from the region 12 adjoining the windings 11 in the axial direction in each case in the axial direction between two windings 11A, 11B, so that therefore a first tongue 20A is assigned to a first winding 11A and a second tongue 20B is assigned to a second winding 11B.

It is particularly advantageous that all the contact elements 20 can be arranged at the same time between the windings 11 by a displacement in the axial direction because they are formed integrally with the switching disk 16 and are correspondingly connected to one another.

Figure 4:
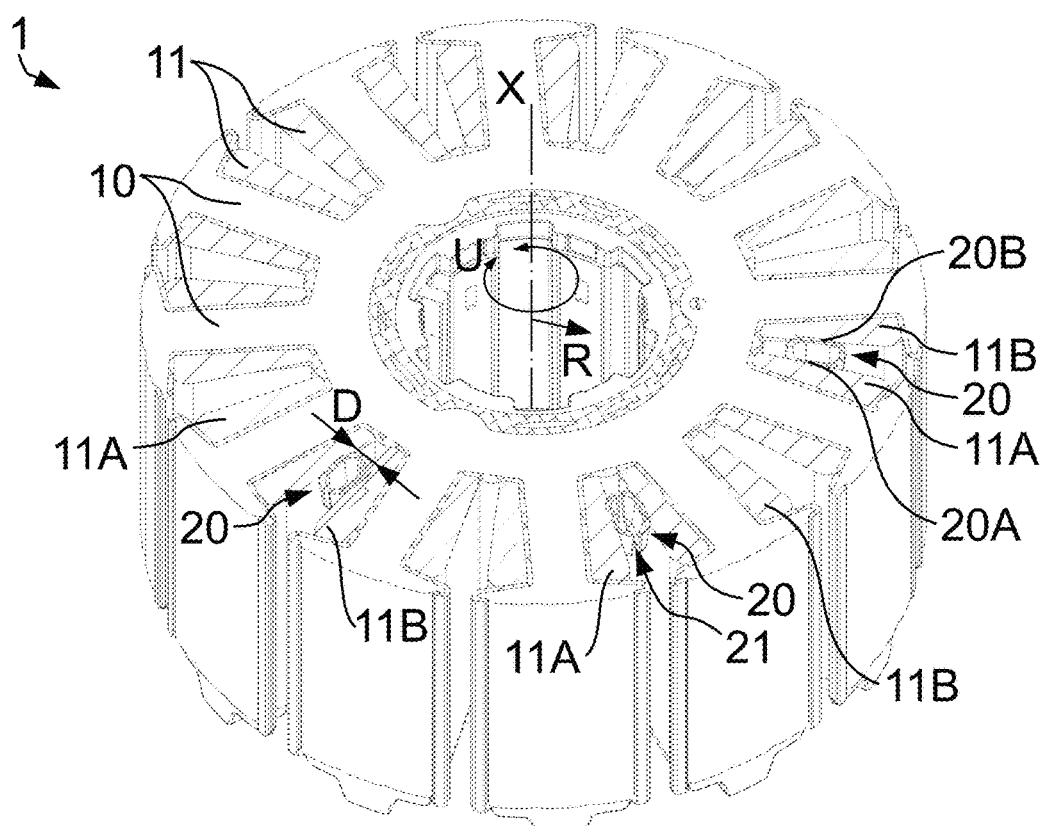
FIG. 4 shows a stator in cross section which is represented in perspective.
Figure 5:
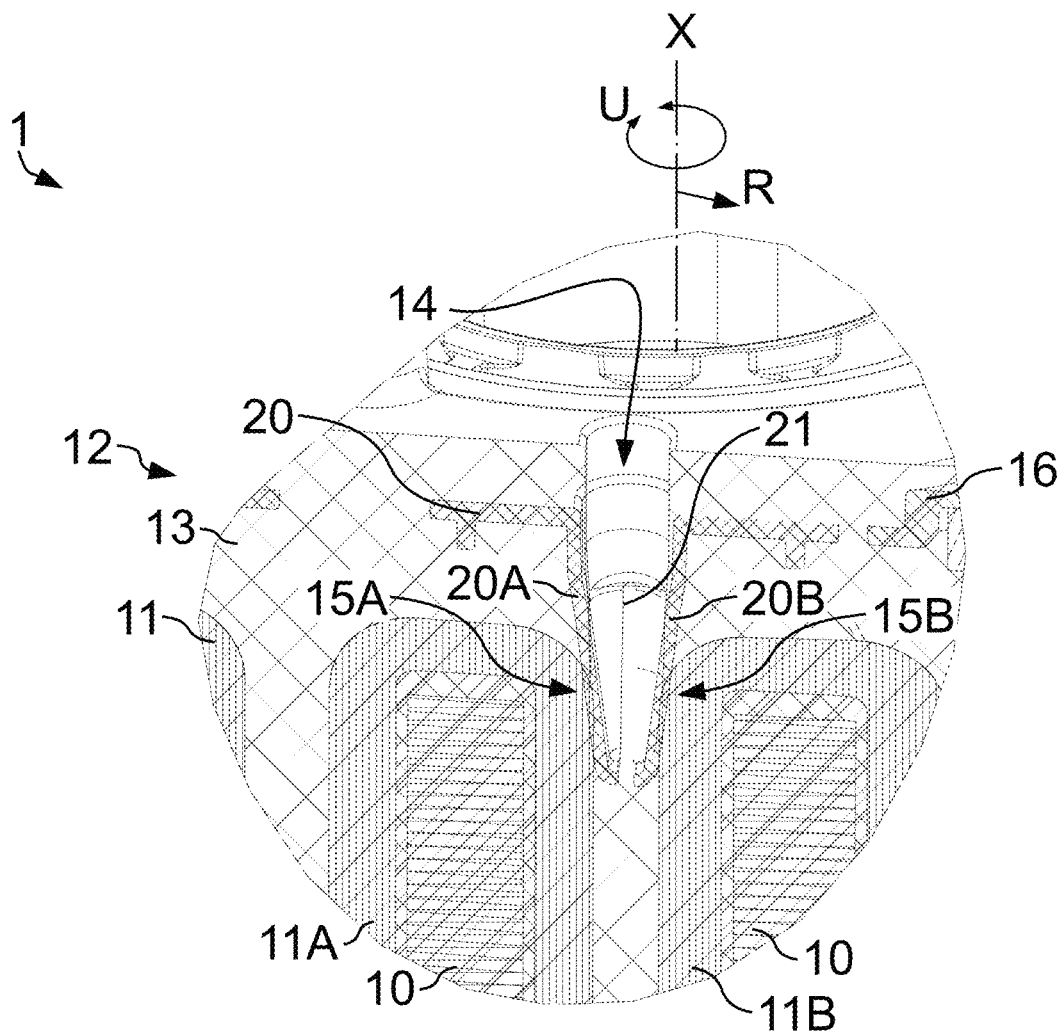
FIG. 5 shows a detail view of a section through a remolded stator.

In order to avoid damage to the windings 11, the section of the contact elements which extends between the windings 11 has a smaller extent in the circumferential direction U than the minimum distance D of the windings 11A, 11B from one another in the radial region in which the contact element 20 is to be arranged, which is represented in particular in FIG. 4.

Figure 2:
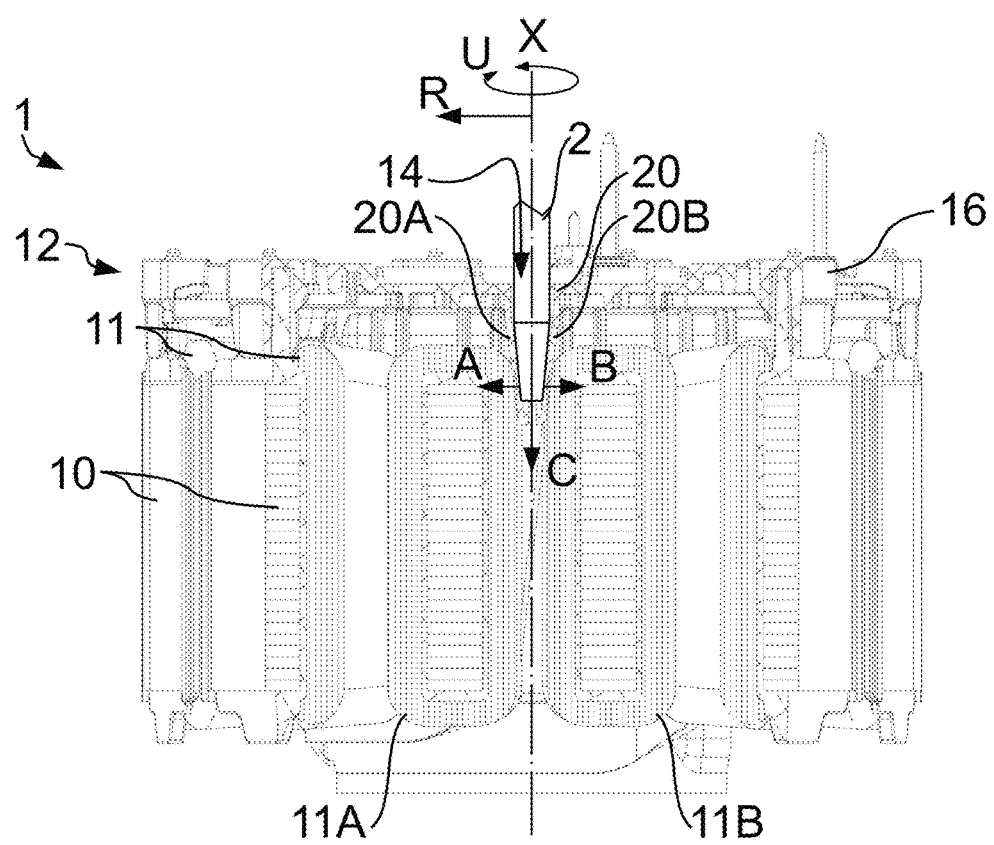
FIG. 2 shows a side view of the stator in partial section.

If the contact elements 20 were arranged in their undeformed state between the windings 11, so that the two tongues 20A, 20B each extend between two adjacent windings 11A, 11B, a core 2, represented schematically in FIG. 2, is introduced in the axial direction into each of the contact elements 20, so that the first tongue 20A is pressed or spread apart in a first direction A by the axial movement C of the core 2 along the circumferential direction U and, in particular, orthogonally to the axial direction, and the second tongue 20B is pressed or spread open in an opposite second direction B until the first tongue 20A abuts the first winding 11A and the second tongue 20B abuts the second winding 11B.

By pressing or expanding, the contact elements 20 or their tongues 20A, 20B are deflected and correspondingly brought into a deformed state, wherein these can also be deformed plastically or resiliently.

Since the core 2 does not directly abut the windings 11, 11A, 11B and does not move along the windings 11, 11A, 11B during its movement C or scrapes along the windings 11, 11A, 11B, the windings 11, 11A, 11B cannot be damaged by the core 2.

The contact elements 20 or their tongues 20A, 20B are now held in the deformed state by the cores 2 and the windings 11, 11A, 11B together with the switching disk 16 are overmolded or remolded with an electrically non-conductive material, as a result of which the encapsulation 13 is formed.

Since the space between the tongues 20A, 20B is in each case at least partially filled with the core 2, the electrically non-conductive material can penetrate the slot 21 and partially between the tongues 20A, 20B, wherein the area filled by the core 2 remains free. If the core 2 or the cores 2 are removed from the stator 1 after the material has solidified to form, the pocket 14 remains between the two tongues 20A, 20B.

At least one section 15A, 15B of the wall of the pocket 14 is formed by the respective tongue 20A, 20B, so that this section 15A, 15B directly adjoins the respective winding 11A, 11B on the outside and is free from the material forming the encapsulation 13 on the inside.

A temperature monitoring element, which is not represented, can be arranged in the pocket 14, which temperature monitoring element directly rests on at least one of the sections 15A, 15B and can thus be in contact with the respective winding 11A, 11 via the contact element 20 in order to detect the temperature of the respective winding 11A, 11B. Correspondingly, the temperature monitoring elements can detect the temperature or the temperatures of the windings 11A, 11B in a rapid reaction and an electric motor with such a stator 1 can be exactly controlled.

The practice of the disclosure is not limited to the preferred exemplary embodiments set forth above. Instead, a number of variants may be contemplated which use the represented solution also in case of basically different embodiments.

The invention claimed is:
1. A stator for an electric motor comprising:
teeth arranged about an axis of rotation, each of which is wound with a winding, and at least one thermally conductive contact element,
wherein the at least one contact element extends from a region adjoining the windings in the axial direction in each case between two windings and is configured to be deformable and/or deflectable in the circumferential direction for direct contact with at least one of the windings, wherein the at least one contact element has a smaller extension in an undeformed state in the circumferential direction about the axis of rotation than a distance in the circumferential direction of the two windings from one another, wherein the windings are overmolded or remolded with an electrically non-conductive material forming an encapsulation, which material forms with the at least one contact element in each case a pocket for receiving a temperature monitoring element which can be inserted in the axial direction, the pocket having a winding-side wall that is formed at least in a section by the contact element directly abutting the winding.

2. The stator according to claim 1, wherein the at least one contact element has in each case two tongues extending in the axial direction between the two windings, of which a first tongue for direct contact with a first of the two windings in a first circumferential direction and a second tongue for direct contact with a second of the two windings in an opposite second circumferential direction is formed to be deformable and/or deflectable, and the wall of the pocket formed with the contact element is formed in a first section by the first tongue directly abutting the first winding and in a second section by the second tongue directly abutting the second winding.

3. The stator according to claim 2, wherein the two tongues surround the pocket in the circumferential direction and are separated by a slot extending in the radial direction.

4. The stator according to claim 2, wherein the electrically non-conductive material extends between the two tongues and through the slot.

5. The stator according to claim 2, wherein the tongues run toward one another starting from the region adjoining the windings in the axial direction.

6. The stator according to claim 1, further having a switching disk which is arranged in the region adjoining the windings in the axial direction, wherein the at least one contact element is fixed to the switching disk by its respective side extending from the region between the two windings and is formed integrally with the switching disk.

7. The stator according to claim 6, wherein the switching disk is overmolded or remolded together with the windings with the electrically non-conductive material.

8. The stator according to claim 1, wherein in each case at least one temperature monitoring element is arranged in the respective pocket in such a way that this element directly abuts the section of the contact element forming the wall of the pocket opposite the respective winding.

9. An electric motor with a stator according to claim 1.

10. A method of manufacturing a stator according to claim 1, wherein the at least one contact element is pushed in contact-free manner relative to the windings between two windings in each case, so that the contact element extends from the region adjoining the windings in the axial direction between the windings without touching them, wherein a core is pushed from the axially adjoining region in the axial direction into and/or against the contact element, the contact element is deformed and/or deflected by the core in the circumferential direction and is pressed directly against at least one winding.

11. The method according to claim 10, wherein the windings, the at least one contact element and the core are overmolded or remolded with the electrically non-conductive material to form the encapsulation and the respective pocket is formed for each contact element.

12. The method according to claim 10, wherein the core is formed as a negative of the pocket.

13. The stator according to claim 1, wherein the region adjoining the windings projects axially from an axial end surface of the windings.

14. The stator according to claim 1, wherein the at least one contact element projects axially away from the windings.

15. The stator according to claim 1, wherein the at least one contact element, in the undeformed state, does not abut the two windings.

* * * * *